C. MEIER & G. LANGEN.
SIDE HEAD TOOL HOLDER FOR METAL PLANERS.
APPLICATION FILED SEPT. 4, 1908.

937,707. Patented Oct. 19, 1909.

Inventors,
Charles Meier and
George Langen.
By Robert S. Carr. Atty.

Witnesses,
E. A. Rogers.
Samuel S. Carr.

UNITED STATES PATENT OFFICE.

CHARLES MEIER AND GEORGE LANGEN, OF CINCINNATI, OHIO, ASSIGNORS TO THE CINCINNATI PLANER COMPANY, OF CINCINNATI, OHIO, A CORPORATION OF OHIO.

SIDE-HEAD TOOL-HOLDER FOR METAL-PLANERS.

937,707.  Specification of Letters Patent.  Patented Oct. 19, 1909.

Application filed September 4, 1908. Serial No. 451,754.

*To all whom it may concern:*

Be it known that we, CHARLES MEIER and GEORGE LANGEN, citizens of the United States, residing at Cincinnati, Ohio, have invented new and useful Improvements in Side-Head Tool-Holders for Metal-Planers, of which the following is a specification.

Our invention relates to an improvement in metal planers and particularly to an improved clamp for a hinged tool holder.

The object of the invention is to provide an adjustably yielding and conveniently manipulated clamp especially adapted for such tool holder when mounted on a side-head. This object is attained in the following described manner as illustrated in the accompanying drawings, in which:—

Figure 1:
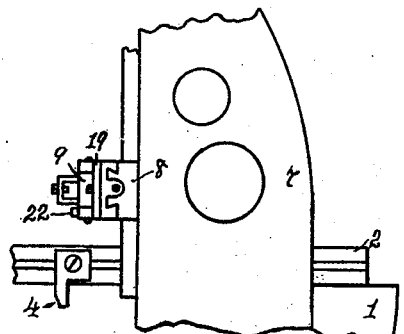
Figures 2, 4:
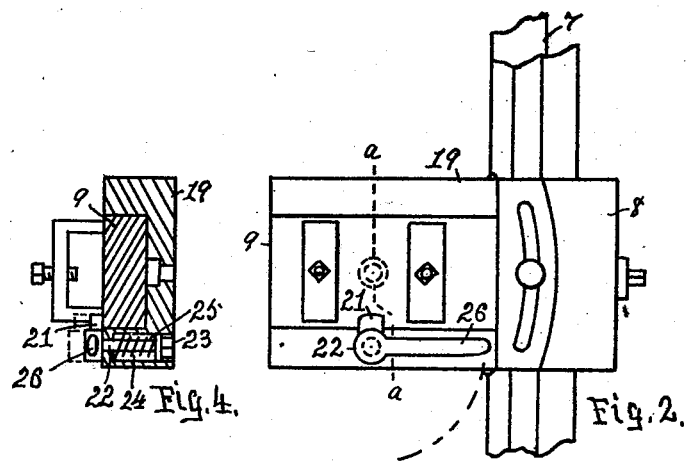
Figure 3:
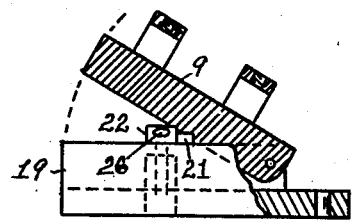

Figure 1 is a side elevation with parts broken away of a metal working planer embodying our improvements; Fig. 2, a front elevation with parts broken away; Fig. 3 a bottom view with parts broken away, and parts in section, and Fig. 4 a transverse section on the line *a—a* of Fig. 2.

In the drawings, 1 represents the bed of a metal working planer, 2 the table, 4 one of the shifting dogs thereon, 7 the housing, 8 the side head adjustable thereon, and provided with a hinged tool holder 9, all being constructed and arranged in the ordinary manner except as hereinafter described.

The tool holder 9 hinged on member 19 of the side head 8 in the usual manner is maintained in the closed position under a yielding pressure by means of the engagement therewith of the projecting lip 21 formed on the head of the clamping bolt 22. Said bolt is provided with a nut 23 for adjusting the coiled spring 24 thereon within the counter bore 25 formed in the edge of member 19. A handle 26 projects laterally from the head of said bolt for convenience of access in turning the bolt with lip 21 out of engagement with the edge of the tool holder that it may be turned in an outward direction, as shown in Fig. 3, when desired for sharpening the tool or for other purposes.

In operation, the position of the handle on the clamping bolt is conveniently accessible to the operator especially when a tool is clamped in position on the tool holder.

Having fully described our improvements, what we claim as our invention and desire to secure by Letters Patent of the United States is:—

1. In a planer, the combination of a side-head, a tool holder hinged thereto, a clamping member in the side-head and adapted to move transversely thereof, a handle whereby said member may be rotated out of and into engagement with the tool holder, and a spring for maintaining said clamping member in yielding engagement with said tool holder.

2. In a planer, the combination with a side-head, of a tool holder hinged thereon, a clamping bolt provided with a lip for engaging the tool holder and retaining it in place, a spring arranged to maintain said lip in such engagement under a predetermined yielding pressure, and a handle on said bolt for turning said lip out of and into yielding engagement with the tool holder.

3. In a planer, the combination with a side-head having a countersunk bolt hole therethrough, a tool holder hinged to the side-head, a bolt located in said hole and having a lip for engaging the tool holder to retain it in place, a spring about the bolt in the countersink, a nut on said bolt for adjusting the tension of said spring, and a handle to said bolt for swinging said lip out of and into engagement with the tool holder.

CHARLES MEIER.
GEORGE LANGEN.

Witnesses:
JOSEPH F. ECKHOFF,
SAMUEL S. CARR.